Patented Dec. 27, 1927.

1,654,125

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING AMMONIUM CHLORIDE.

No Drawing.   Application filed January 15, 1925.   Serial No. 2,696.

At present ammonium chloride is manufactured on a commercial scale by mixing crude or commercial hydrochloric acid, generally called muriatic acid, and gas liquor,— a crude solution of ammonia—and recovering the ammonium chloride so formed from the reaction mixture by concentration and crystallization. This process, due to the presence of impurities in the muriatic acid and gas liquor ordinarily gives a product of a gray color, and due to the water contents of the muriatic acid and gas liquor involves a considerable cost for heat for concentrating. This cost for heat is an important item in the manufacture of the relatively inexpensive product. The evaporation of an ammonium chloride solution, such as that produced by mixing muriatic acid and gas liquor, as is known is irksome, expensive and involves a considerable loss. The ammonium chloride solution is moreover rather corrosive to the evaporating apparatus, iron being used ordinarily, as a result of which the apparatus is rapidly corroded and the ammonium chloride contaminated and colored by the iron.

It has been proposed to eliminate this troublesome and expensive concentration of the reaction mixture by combining hydrochloric acid gas and ammonia gas directly. This process however is not entirely satisfactory.

I have now found that the two processes above referred to represent opposite extremes and that the principal objectionable features of both may be eliminated by a compromise procedure in which gas liquor is treated with gaseous hydrochloric acid. This procedure has many practical advantages. In the first place, it provides a sufficient amount of water in the reaction mixture to retain the bulk of the impurities in the crude hydrochloric acid gas coming for instance directly from a salt cake furnace and in the gas liquor, and on the other hand it avoids the introduction of a large amount of water into the reaction mixture which must be evaporated in the recovery of the ammonium chloride in the form of the solid salt. It avoids the provision of means, such as a reflux condenser, for condensing and returning to the reaction vessel water, unreacted ammonia and hydrochloric acid and ammonium chloride vapors as in the process according to which gaseous ammonia and hydrochloric acid are combined directly.

Since gas liquor is the principal commercial source of ammonia, the manufacture of ammonium chloride from gaseous hydrochloric acid and ammonia gas on a commercial scale involves a preliminary production of the hydrochloric acid gas, for instance, by the salt cake furnace method, and the production of gaseous ammonia from gas liquor. This is inconvenient for both the chemicals manufacturer who makes hydrochloric acid and the coke and artificial gas manufacturer who produces the gas liquor. The manufacture of ammonium chloride by applicant's process is much more convenient. The chemicals manufacturer may buy the gas liquor and use it directly without either converting his hydrochloric acid gas coming from the salt cake furnace into muriatic acid or generating gaseous ammonia from the gas liquor, or the gas liquor producer may instal a hydrochloric acid plant.

A convenient procedure in accordance with my invention is as follows:

Hydrochloric acid gas is absorbed in a body of mother liquor from a previous operation and gas liquor is run in simultaneously at a rate sufficient to maintain the reaction mixture slightly acid until the capacity of the apparatus is reached, when the supply of hydrochloric acid is stopped and sufficient gas liquor added to make the reaction mixture slightly basic. The ammonium chloride is then separated by crystallization in the usual way and the mother liquor or a portion of it is used in a repetition of the process. Since impurities tend to accumulate in the mother liquor, it is necessary from time to time to purify it or the whole mother liquor may be worked up for its ammonium chloride content and a new cycle started by using water instead of mother liquor as the reaction medium.

The water content of the gas liquor of course varies so that in some cases it may be necessary to concentrate the reaction mixture in the recovery of the ammonium chloride, but the amount of concentration in any case is very small as compared with that required when muriatic acid is used. As a rule the process may be so controlled that the ammonium chloride may be crystallized directly from the reaction mixture without concentration, for instance by the choice of gas liquor of the desired ammonia content, or the production of such a gas liquor by mixing liquors of different ammonia contents. Some evaporation from the reaction mixture which, due to the reaction heat, reaches a relatively high temperature, occurs and the process may be controlled by expediting or suppressing this evaporation, if necessary some or all of the water evaporated may be condensed and returned to the reaction mixture or the evaporation may be increased by blowing air over the reaction mixture.

The process gives an ammonium chloride content of very good quality with respect to purity and color, with a substantial saving in the cost of production.

I claim:—

1. Process for the production of ammonium chloride which comprises introducing hydrochloric acid gas and an aqueous solution of ammonia into an aqueous reaction medium.

2. Process for the production of ammonium chloride which comprises introducing hydrochloric acid gas and gas liquor into an aqueous reaction medium.

3. Process for the production of ammonium chloride which comprises introducing hydrochloric acid gas and gas liquor into the mother liquor of a previous operation at such a rate as to maintain the reaction mixture slightly acid, stopping the introduction of hydrochloric acid gas and thereafter introducing sufficient gas liquor to render the reaction mixture alkaline, crystallizing ammonium chloride from the reaction mixture and using the mother liquor in a repetition of the procedure.

In testimony whereof, I affix my signature.

HENRY HOWARD.